US012595323B2

(12) United States Patent
Müller et al.

(10) Patent No.: US 12,595,323 B2
(45) Date of Patent: Apr. 7, 2026

(54) VINYL ACETATE-BASED COPOLYMER DISPERSIONS WITH SMALL PARTICLE SIZE

(71) Applicant: Celanese International Corporation, Irving, TX (US)

(72) Inventors: Harmin Müller, Hofheim (DE); Matthias Seib, Friedberg (DE); Argiri Tsami-Schulte, Kelkheim (DE); Bastiaan Van Voorn, Beuningen (NL)

(73) Assignee: Celanese International Corporation, Irving, TX (US)

( * ) Notice: Subject to any disclaimer, the term of this patent is extended or adjusted under 35 U.S.C. 154(b) by 678 days.

(21) Appl. No.: 17/923,151

(22) PCT Filed: Apr. 8, 2020

(86) PCT No.: PCT/US2020/027251
§ 371 (c)(1),
(2) Date: Nov. 3, 2022

(87) PCT Pub. No.: WO2021/206706
PCT Pub. Date: Oct. 14, 2021

(65) Prior Publication Data
US 2023/0348639 A1    Nov. 2, 2023

(51) Int. Cl.
*C08F 210/02* (2006.01)
*C09D 5/00* (2006.01)
*C09D 5/02* (2006.01)
*C09D 123/08* (2006.01)

(52) U.S. Cl.
CPC ........... *C08F 210/02* (2013.01); *C09D 5/002* (2013.01); *C09D 5/02* (2013.01); *C09D 123/0892* (2013.01)

(58) Field of Classification Search
CPC ......... C08F 210/02; C09D 5/002; C09D 5/02; C09D 123/0892
See application file for complete search history.

(56) References Cited

U.S. PATENT DOCUMENTS

| | | | |
|---|---|---|---|
| 5,681,880 A | 10/1997 | Desor et al. | |
| 8,791,190 B2 | 7/2014 | Pressley et al. | |
| 2003/0100671 A1* | 5/2003 | Pierre | C09D 123/0853 524/713 |
| 2014/0088249 A1* | 3/2014 | Daniels | C08F 218/08 524/850 |
| 2016/0153148 A1* | 6/2016 | Pan | C08F 218/08 523/453 |
| 2017/0362425 A1 | 12/2017 | Siddiqui et al. | |

FOREIGN PATENT DOCUMENTS

| | | |
|---|---|---|
| CN | 101503485 B | 9/2012 |
| CN | 103509419 A | 1/2014 |
| CN | 104105826 A | 10/2014 |
| CN | 104302716 A | 1/2015 |
| CN | 105431589 B | 5/2018 |
| CN | 108430953 B | 1/2021 |
| EP | 0709441 A2 | 5/1996 |
| EP | 2518109 A1 | 10/2012 |
| WO | 2014/204777 A2 | 12/2014 |

OTHER PUBLICATIONS

Notification of the First Office Action for CN Appln No. 202080099501.3 dated Aug. 26, 2023, all pages.
Notice of Decision to Grant received for CN Appln No. 202080099501.3 dated Nov. 5, 2023, all pages.
International Search Report and Written Opinion for PCT/US2020/027251 mailed Nov. 17, 2020, all pages.
International Preliminary Report on Patentability for PCT/US2020/027251 issued Oct. 6, 2022, all pages.

* cited by examiner

*Primary Examiner* — Jiangtian Xu
(74) *Attorney, Agent, or Firm* — Kilpatrick Townsend & Stockton LLP

(57) ABSTRACT

Aqueous copolymer dispersions are useful for incorporating into primer formulations. The aqueous copolymer dispersions comprise a vinyl acetate-based copolymer and have a particle size of less than or equal to 120 nanometers. The resulting primer formulations have good penetration in various substrates, and/or water resistance/binding properties.

20 Claims, No Drawings

VINYL ACETATE-BASED COPOLYMER DISPERSIONS WITH SMALL PARTICLE SIZE

CROSS-REFERENCE TO RELATED APPLICATIONS

This application is a U.S. National Phase of PCT/US2020/027251, filed Apr. 8, 2020, entitled "VINYL ACETATE-BASED COPOLYMER DISPERSIONS WITH SMALL PARTICLE SIZE," which is hereby incorporated by reference.

FIELD

This disclosure relates to vinyl acetate-based polymer dispersions useful for primer applications. This disclosure relates more specifically to vinyl acetate-based emulsion polymers having an average particle size of less than 120 nm, which allows for good penetration on various substrates.

BACKGROUND

Primers are known for their use on substrates prior to applying paint to a substrate. For examples, primers may aid in paint adhesion to a substrate and, for water-based paints, primers may help to decrease water penetration into a porous substrate and improve film formation. Primers may also reducing bleeding of components through a substrate. Substrates, such as wood, medium density fiberboard, and gypsum plasterboards often contain constituents, such as tannins, tannin-like substances, and lignin, which may lead to bleeding through paint applied to the substrate. Such bleeding, which causes discoloration to the paint, is undesirable. Acrylic-based primers and styrene acrylic-based polymers have been disclosed in the art as effective at preventing paint discoloration. Acrylic-based primers typically include an acrylic polymer with a small particle size, e.g., less than 120 nm on average. Styrene acrylic-based polymers typically include styrene and acrylic copolymers with a small particle size, e.g., less than 120 nm on average.

U.S. Pat. No. 5,681,880 discloses aqueous dispersions which comprise an emulsion polymer which is stable with respect to polyvalent zirconium ions, and a water-soluble zirconium compound, prevent the penetration of constituents from substrates which show a tendency to bleeding, and the dispersions are therefore suitable as a primer, especially for woods.

U.S. Pat. No. 8,791,190 discloses one component aqueous compositions comprising (i) a cationic stain blocking polymer chosen from (a) 0.01 to 7 wt. % of anion exchange resin copolymer gelular or dual morphology beads that have a weight average particle size of from 0.1 to 20 m and a low copolymerized crosslinker content of from 0.5 to 2.0 wt. %, (b) from 1 to 30 wt. % a crosslinked cationic addition polymer and (c) mixtures thereof, (ii) one or more emulsion copolymer having a copolymerized residue of at least one phosphorus acid monomer, and (iii) a stabilizer of from 0.1 to 2 wt. % of an inorganic phosphorus containing dispersant, and from 0.2 to 5.0 wt. % of a mixture of a nonionic surfactant and an anionic surfactant, both wt. % s based on the total weight of emulsion copolymer solids. The compositions provide stabilized binders for in a single coat primer plus topcoat coatings and paints.

Although existing acrylic-based primers and styrene acrylic-based polymers may solve some problems, further improvements are desirable.

SUMMARY

In some aspects, the present disclosure is directed to a method for preparing an aqueous copolymer dispersion by emulsion polymerization, the method comprising: a) pre-charging a reactor with vinyl acetate monomer, a second monomer, an ionic-group containing monomer, water, and an emulsifier system, wherein the pre-charge comprises from 0.5 to 20% of the total amount of vinyl acetate and at least 30% of the total amount of the second monomer; b) adding a remaining amount of vinyl acetate monomer and the second monomer to the reactor; c) adding an initiator system to the reactor; and d) conducting the polymerization reaction at a temperature of $\geq 65°$ C. to form an aqueous vinyl acetate-second monomer copolymer dispersion having a solids content from 5 to 55% and a particle size of dw$\leq$120 nm as measured by dynamic light scattering at 90° (Contin Fit); wherein the emulsifier system is present in an amount from 4 to 8 pphm. The emulsion polymerization may be conducted at a temperature of $>75°$ C., more preferably $>80°$ C. The second monomer may comprise ethylene, butyl acrylate, vinyl nodecanoate, or 2-ethylhexyl acrylate. The pre-charge may comprise from 0.5 to 10% of the total amount of vinyl acetate monomer, more preferably 0.5 to 5%. The second monomer may be present in an amount of $>14$ pphm, preferably from 20 to 30 pphm. The pre-charge may comprise $>50\%$ of the total amount of the second monomer. The initiator system may include at least one ionic group. The initiator system may comprise at least one of sodium peroxo disulfates, potassium peroxo disulfates, and combinations thereof. The initiator system may be present in an amount of at least 0.2 pphm, preferably at least 0.3 pphm, more preferably at least 0.5 pphm. The emulsifier system may comprise ionic emulsifiers, non-ionic emulsifiers, or combinations thereof. The emulsifier system may comprise an ionic emulsifier, and wherein the ionic emulsifier comprises an alkyl sulfate, an alkyl ethoxy sulfate, or an alkyl sulfonate, preferably sodium dodecyl sulfate. The emulsifier system may comprise a non-ionic emulsifier, and wherein the non-ionic emulsifier comprises an alkyl ethoxylate, preferably with EO$\geq$20 mol. The ionic-group containing monomer may be present in an amount of $\geq 0.2$ pphm, preferably $\geq 1.0$ pphm. The ionic-group containing monomer may comprise sodium vinyl sulfonate. The solids content of the polymer dispersion may be from 14 to 46%, preferably from 30 to 46%. The polymerization may be conducted in a stirred tank reactor system in a non-continuous way. The particle size distribution dw/dn measured by DLS at 90° may be 2 or less, preferably 1.5 or less. The polymeric stabilizers may be present in an amount of 0.6 parts per hundred monomers or less, preferably 0 pphm. The particle size dw may be from 50 to 120 nm, preferably from 70 to 120 nm, more preferably from 70 to 100 nm, as measured by dynamic light scattering at 90°. The method may further comprise an additive, wherein the additive is a crosslinker, a buffer, a defoamer, a film forming agent, a salt, or combinations thereof. The reactor may further comprise a crosslinker, wherein the crosslinker comprises a silane-based crosslinker, an epoxy-based crosslinker, or combinations thereof. In some aspects, the crosslinker is a silane-based crosslinker. The silane-based crosslinker may comprise vinyl triethoxy silane, vinyl trimethoxy silane, vinyl tris-(1-methoxy) isopropoxy silane, methacryloxypropyl tris(2-methoxyethoxy)silane, 3-methacryloxypropyl trimethoxysilane, 3-methacryloxypropylmethyl dimethoxysilane, 3-methacryloxymethyl trimethoxysilane, or combinations thereof, preferably vinyl triethoxy silane or vinyl trimethoxy silane. The silane-based crosslinker may be present from 0 to 2 pphm, preferably 0 to 1 pphm, more preferably from 0.1 to 0.7 pphm, most preferably from 0.2 to 0.6 pphm. In some aspects, the crosslinker is an epoxy-based crosslinker such as glycidyl (meth)acrylate. The epoxy-based crosslinker may comprise from 0 to 3 pphm, preferably from 0.5 to 2.0 pphm, more preferably from 0.5 to 1.0 pphm. The crosslinker may be added with the monomer precharge, with the remaining monomer feed, or with both.

In some aspects, the present disclosure is directed to an aqueous copolymer dispersion comprising at least one copolymer formed by the method described above.

In some aspects, the present disclosure is directed to a primer formulation comprising the aqueous copolymer dispersion described above, wherein the primer formulation comprises a solids content from 1 to 30% of, preferably from 3 to 20%, more preferably from 4 to 15%. The primer formulation may further comprise an additive, wherein the additive is a wetting agent, a preservative, a hydrophobic agent, water glass, a wood protection additive, a pigment, a thickener, a dispersing agent/stabilizer, or combinations thereof.

The present disclosure is also directed to the use of the aqueous copolymer dispersion of described above as a binder in paints, primers, and adhesives. In some aspects, when used as a primer, the primer formulation may be used on/applied to a substrate, wherein the substrate is an inorganic surface material or an organic surface material. In some aspects, the primer is used on a substrate comprising hard wood, soft wood, gypsum board, old paint surfaces, old rendering surfaces, bricket walls, lime-cement plaster surfaces, medium density fiberboard, wood fiber board. The primer may have a mean value penetration score of less than or equal to 2, a solidification score of greater than or equal to 8 g, and/or a water resistance after solidification score of 1, each of tests being described further in the examples.

The present disclosure is also directed to a method for preparing an aqueous copolymer dispersion by emulsion polymerization, the method comprising: a) pre-charging a reactor with vinyl acetate monomer, ethylene monomer, an ionic-group containing monomer, water, and an emulsifier system, wherein the pre-charge comprises from 0.5 to 20% of the total amount of vinyl acetate and at least 30% of the total amount of ethylene; b) adding a remaining amount of vinyl acetate monomer and ethylene monomer to the reactor; c) adding an initiator system to the reactor; and d) conducting the polymerization reaction at a temperature of >65° C. to form an aqueous vinyl acetate-ethylene copolymer dispersion having a solids content from 5 to 55% and a particle size of dw≤120 nm as measured by dynamic light scattering at 90° (Contin Fit); wherein the emulsifier system is present in an amount from 4 to 8 pphm. The emulsion polymerization may be conducted at a temperature of ≥75° C., more preferably ≥80° C. The pre-charge may comprise from 0.5 to 10% of the total amount of vinyl acetate monomer, more preferably 0.5 to 5%. The ethylene may be present in an amount of ≥14 pphm, preferably from 20 to 30 pphm. The pre-charge may comprise ≥50% of the total amount of the ethylene. The initiator system may include at least one ionic group. The initiator system may comprise at least one of sodium peroxo disulfates, potassium peroxo disulfates, and combinations thereof. The initiator system may be present in an amount of at least 0.2 pphm, preferably at least 0.3 pphm, more preferably at least 0.5 pphm. The emulsifier system may comprise ionic emulsifiers, non-ionic emulsifiers, or combinations thereof. The emulsifier system may comprise an ionic emulsifier, and wherein the ionic emulsifier comprises an alkyl sulfate, an alkyl ethoxy sulfate, or an alkyl sulfonate, preferably sodium dodecyl sulfate. The emulsifier system may comprise a non-ionic emulsifier, and wherein the non-ionic emulsifier comprises an alkyl ethoxylate, preferably with EO≥20 mol. The ionic-group containing monomer may be present in an amount of ≥0.2 pphm, preferably ≥1.0 pphm. The ionic-group containing monomer may comprise sodium vinyl sulfonate. The solids content of the polymer dispersion may be from 14 to 46%, preferably from 30 to 46%. The polymerization may be conducted in a stirred tank reactor system in a non-continuous way. The particle size distribution dw/dn measured by DLS at 90° may be 2 or less, preferably 1.5 or less. The polymeric stabilizers may be present in an amount of 0.6 parts per hundred monomers or less, preferably 0 pphm. The particle size dw may be from 50 to 120 nm, preferably from 70 to 120 nm, more preferably from 70 to 100 nm, as measured by dynamic light scattering at 90°. The method may further comprise an additive, wherein the additive is a crosslinker, a buffer, a defoamer, a film forming agent, a salt, or combinations thereof. The reactor may further comprise a crosslinker, wherein the crosslinker comprises a silane-based crosslinker, an epoxy-based crosslinker, or combinations thereof. In some aspects, the crosslinker is a silane-based crosslinker. The silane-based crosslinker may comprise vinyl triethoxy silane, vinyl trimethoxy silane, vinyl tris-(1-methoxy) isopropoxy silane, methacryloxypropyl tris(2-methoxyethoxy)silane, 3-methacryloxypropyl trimethoxysilane, 3-methacryloxypropylmethyl dimethoxysilane, 3-methacryloxymethyl trimethoxysilane, or combinations thereof, preferably vinyl triethoxy silane or vinyl trimethoxy silane. The silane-based crosslinker may be present from 0 to 2 pphm, preferably 0 to 1 pphm, more preferably from 0.1 to 0.7 pphm, most preferably from 0.2 to 0.6 pphm. In some aspects, the crosslinker is an epoxy-based crosslinker such as glycidyl (meth)acrylate. The epoxy-based crosslinker may comprise from 0 to 3 pphm, preferably from 0.5 to 2.0 pphm, more preferably from 0.5 to 1.0 pphm. The crosslinker may be added with the monomer precharge, with the remaining monomer feed, or with both.

DETAILED DESCRIPTION

The details of the polymer dispersions will be described herein with context to the various embodiments. The present disclosure relates aqueous copolymer dispersions having a particle size of less than or equal to 120 nanometers, as well as to methods for making such polymer dispersions. These polymer dispersions may be incorporated into primer formulations, which are used to coat substrates to minimize water penetration into the substrate, as well as to prevent bleeding through of impurities from the substrate through paint applied to the substrate. The amount of polymer dispersion to be incorporated into the primer formulation may be determined based on the desired primer formulation solids content. Without being bound by theory, it is believed that by forming a primer formulation comprising an aqueous copolymer dispersion with small particle size, e.g., less than or equal to 120 nm on average, the penetration performance of the primer is improved as compared to formulations with larger particle size. Although acrylic and styrene/acrylic-based polymer dispersions have been formulated with a small particle size, they are more expensive than corresponding vinyl acetate-based copolymer dispersions. It has, however, been difficult to prepare vinyl acetate-based copolymer dispersions with a small particle size, particularly vinyl acetate-ethylene copolymer dispersions. Surprisingly and unexpectedly, the inventors found that using specific steps, reaction conditions and components/compositions in the polymerization reaction, they were able to formulate such vinyl acetate-based copolymer dispersions and that the dispersions, when incorporated into primer formulations, had comparable or superior performance as compared to acrylic-based primers, styrene/acrylic-based polymers, or primers with larger vinyl acetate-based copolymer dispersion particle size. In particular, primer formulations comprising the aqueous copolymer dispersions formed according to the methods described herein had comparable or superior penetration of substrates, solidification on substrates (related to binding capacity of the binder of substrate material), adhesion on substrates, and, in some aspects, water resistance. Additionally, the primer formulations comprising the aqueous copolymer dispersions formed according to the methods described herein increased the strength inside of the substrate, such as a gypsum board substrate, and for water-based paints, allowed for film formation of paint on the substrate.

Accordingly, the present disclosure is directed to a method for the emulsion polymerization of an aqueous copolymer dispersion, e.g., in a stirred tank reactor system. The stirred tank reactor system may be a simple tank reactor system equipped with a stirrer and a coil or jacket cooling system. The copolymer dispersion may be a vinyl acetate-based copolymer dispersion, such as a vinyl-acetate-ethylene copolymer dispersion, a vinyl acetate-butyl acrylate copolymer dispersion, a vinyl acetate-vinyl neodecanoate copolymer dispersion, or a vinyl acetate-2 ethyl hexyl acrylate copolymer dispersion. As used herein, the second listed monomer in the copolymer dispersion (i.e., butyl acrylate, ethylene, or vinyl neodecanoate) is referred to as the second monomer. Vinyl neodecanoate is also referred to by its trade name, VeoVa10. Vinyl neodecanoate refers to a mixture of isomeric vinyl esters of neodecanoic acid. In some aspects, the copolymer dispersion is a vinyl acetate-ethylene copolymer dispersion. Optionally, additional monomers may be included. The polymerization process may include feeding a pre-charge to the reactor, wherein the pre-charge comprises monomer, an emulsifier system and water. The monomer may comprise vinyl acetate and a second monomer, such as butyl acrylate, ethylene, vinyl neodecanoate, or 2 ethyl hexyl acrylate. In some aspects, the monomer is ethylene. An additional monomer comprising an ionic group or other functionalities may also be added in the pre-charge. From 0.5 to 20% of the total amount of vinyl acetate to be added to the reactor may be added in the pre-charge. At least 30% of the total amount of the second monomer to be added to the reactor may be added to the pre-charge. The emulsifier system may be added in an amount from 4 to 8 parts per hundred monomers (pphm). The polymerization reaction may be conducted at a temperature of greater than or equal to 65° C. to form an aqueous vinyl acetate-based copolymer dispersion. The polymer dispersion may have a solids content from 5 to 55%, e.g., from 14 to 46% or from 30 to 46%. The polymer dispersion may have a particle size dw of less than or equal to 120 nanometers (nm) as measured by dynamic light scattering at 90°.

As used herein, pphm is based on the total amount of main monomers which add up to 100 pphm, e.g., non-functional monomers. Such non-functional monomers include vinyl acetate, the second monomer (i.e., butyl acrylate, ethylene, vinyl neodecanoate, or 2 ethyl hexyl acrylate), and any other monomers included which are not functional monomers.

Functional monomers, typically present in an amount of 10 pphm or less, preferably 5 pphm or less, are not added to the total amount of main monomers for calculating pphm. Such functional monomers include crosslinkers and stabilizers with a polymerizable group, including silanes, glycidyl methacrylate, vinyl sulfonates, methacrylic or acrylic acids, and others.

The present disclosure further relates to an aqueous copolymer dispersion comprising at least one copolymer formed by the above described emulsion polymerization process. The aqueous copolymer dispersion may be incorporated into a formulation, such as a primer formulation. The aqueous copolymer dispersion may be present in the primer formulation in a the way that the final solids of the primer is from 1 to 30%.

The present disclosure further relates to uses of the aqueous copolymer dispersion in a variety of products, including in a paint and coatings primer, as a primer for gypsum materials, as a primer for inorganic surface materials, as a primer for organic surface materials; as a primer for soft wood materials; as a primer for hard wood materials; as a primer for old paint and rendering surfaces; and a primer for adhesive applications; and as a primer for construction formulations.

Emulsion Polymerization

As described above, the aqueous copolymer dispersion is prepared by emulsion polymerization of free-radically polymerizable monomers, e.g., vinyl acetate, and a second monomer, such as butyl acrylate, vinyl neodecanoate, ethylene, or combinations thereof. The emulsion polymerization reaction may be semi-batch or batch. In some aspects, the polymerization reaction is a semi-batch reaction. The reaction may occur in a pressure reactor and the reactor may be fitted with an anchor or a blade stirrer and cooling/heating jacket or cooling/heating coils to control the reaction temperature. When ethylene is used as the second monomer, a pressure reactor is used. When other monomers, such as butyl acrylate or vinyl neodecanoate are used as the second monomer, a pressure reactor is not needed, i.e., the reaction is conducted at approximately standard pressure and optionally in an open reactor. Such methods are described in the art, including in Encyclopedia of Polymer Science and Engineering, vol. 7, p. 659 ff (1987).

In some aspects, the emulsion polymerization is carried out using a monomer slow add process. In such a process, only some of the vinyl acetate is pre-charged to the reactor in combination with a greater amount of the second monomer. When used as the second monomer, ethylene may be provided at high pressure. In some aspects, a monomer emulsion, comprising vinyl acetate, water, and an emulsifier system, is fed to the reactor.

In some aspects, a water-based solution may be prepared and added to the reactor. The water-based solution may comprise water, an emulsifier system, optional cross-linkers, and optional additives. For example, the water-based solution may comprise a nonionic emulsifier, an ionic emulsifier, and additional components. The additional components may include at least one of a buffer (including but not limited to sodium acetate or phosphate buffer systems), a monomer comprising an ionic group (including but not limited to sodium vinyl sulfonate), a defoamer including but not limited to a mineral oil defoamer or a silicone defoamer), and a reducing agent (including but not limited to sulfur compounds or sodium metabisulfite).

The emulsifier system may comprise a nonionic emulsifier, an ionic emulsifier, and combinations thereof. The emulsifier system may be added to the pre-charge, partially in the pre-charge and partially in the remaining amount of components fed to the reactor, or to the remaining amount of components fed to the reactor. The emulsifier system may be present in an amount from 4 to 8 pphm, e.g., from 4.5 to 8 pphm. The nonionic emulsifier may be present in an amount of at least 1.5 pphm and the ionic emulsifier may be present in an amount of at least 1.5 pphm.

Examples of suitable nonionic emulsifiers include acyl, alkyl, oleyl, and alkylaryl ethoxylates (EO). These products are commercially available, for example, under the tradename Genapol™, Lutensol™ or Emulan™. They include, for example, ethoxylated mono-, di-, and tri-alkylphenols (mol EO: 3 to 80, alkyl substituent radical: $C_4$ to $C_{12}$) and also ethoxylated fatty alcohols (mol EO: 3 to 80; alkyl radical: $C_8$ to $C_{36}$), especially $C_{10}$-$C_{14}$ fatty alcohol (mol EO 3-80) ethoxylates, $C_{11}$-$C_{15}$ oxo-process alcohol (mol EO 3-80) ethoxylates, $C_{16}$-$C_{18}$ fatty alcohol (mol EO 3-80) ethoxylates, $C_{11}$ oxo-process alcohol (mol EO 3-80) ethoxylates, $C_{13}$ oxo-process alcohol (mol EO 3-80) ethoxylates, polyoxyethylenesorbitan monooleate with 20 ethylene oxide groups, copolymers of ethylene oxide and propylene oxide having a minimum ethylene oxide content of 10% by weight, the polyethylene oxide (mol EO 3-80) ethers of oleyl alcohol, and the polyethene oxide (mol EO 3-80) ethers of nonylphenol. Particularly suitable are the polyethylene oxide (mol EO 3-80) ethers of fatty alcohols, more particularly of oleyl alcohol, stearyl alcohol or $C_{11}$ alkyl alcohols. In some aspects, the nonionic emulsifier is an alkyl ethoxylate, such as Emulsogen EPN 287, Rhodasurf 2870, Disponil A 3065, Disponil AFX 3070, Emulan TO 3070.

Examples of suitable ionic (anionic) emulsifiers include sodium, potassium, and ammonium salts of linear aliphatic carboxylic acids of chain length $C_{12}$ to $C_{20}$, sodium hydroxyoctadecane-sulfonate, sodium, potassium, and ammonium salts of hydroxy fatty acids of chain length $C_{12}$ to $C_{20}$ and their sulfonation and/or sulfation and/or acetylation products, secondary alkyl sulfonates, alkyl sulfates, including those in the form of triethanolamine salts, alkyl ($C_{10}$-$C_{20}$) sulfonates, alkyl($C_{10}$-$C_{20}$) arylsulfonates, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, sulfated alkyl or aryl ethoxylate with mol EO between 1 and 10, for example ethoxylated sodium lauryl ether sulfate (mol EO 3-9) or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols or alkylphenols. In some aspects, the ionic emulsifier is an alkyl sulfate or sulfonate, such as sodium dodecyl sulfate.

In addition to or instead of sodium metabisulfite, reducing agents, which are used to inhibit the reaction in the absence of an initiator system during pre-charging (to avoid an uncontrolled start), include alkali metal salts of hydroxymethanesulfinic acid, such as sodium formaldehyde sulfoxylate dihydrate (Rongalit C) or the mixture of 2-hydroxy-2-sulfinateacetic acid disodium salt, 2-hydroxy-2-sulfonateacetic acid disodium salt, and sodium sulfite (Brüggolit® FF6/FF6M and Brüggolit® FF7), mercaptans of chain length $C_{10}$-$C_{14}$, but-1-ene-3-ol, hydroxylamine salts, sodium dialkyl dithiocarbamate, sodium sulfite, sodium bisulfite, sodium thiosulfate, ammonium bisulfite, sodium dithionite, acetone-bisulfite adduct, diisopropylxanthogen disulfide, ascorbic acid, tartaric acid, isoascorbic acid, sodium erythorbate, reducing sugars, boric acid, urea, and formic acid. The reducing agent may be present in an amount from 0.01 to 0.2 pphm.

Additionally catalysts like transition metal salts, such as iron(II)/(III) salts can be added in the pre-charge.

Following addition of the water-based solution the to the reactor, the reactor may be purged with nitrogen to eliminate oxygen. Next, a pre-charge of vinyl acetate may be fed to the reactor, e.g., from 0.5 to 20% of the total amount of vinyl acetate to be added, from 0.5 to 10%, or from 0.5 to 6%. The reactor may then be heated to a target temperature, e.g., greater than or equal to 65° C., greater than or equal to 75° C., or greater than or equal to 80° C. While the reactor is being heated, such as when the reactor is within 20° C. of the target temperature, e.g., within 10° C. of the target temperature, a valve may be opened for adding ethylene. When ethylene is used as the second monomer, the reactor may be pressurized as well, e.g., to a pressure of up to 120 bar, up to 100 bar, up to 75 bar, from 30 to 75 bar, from 20 to 60 bar, or approximately 50 bar, when a pressurized reactor is used. In this pre-charge portion of the reaction, the second monomer, e.g., ethylene, butyl acrylate, vinyl neodecanoate, or 2 ethyl hexyl acrylate, may be added in an amount of greater than or equal to 30%, e.g., greater than or equal to 50% of the total amount of second monomer added. The total amount of second monomer added may be from ≥14 pphm, e.g., from 14 to 30 pphm, from 20 to 30 pphm, or from 15 to 28 pphm. When an additional monomer is included in the polymerization reaction, this additional monomer is a radically polymerizable polymer that may be added in an amount of less than or equal to 20 pphm.

Following the completion of the ethylene pre-charge and reactor pressurization, at least a first portion of an initiator system is added to the reactor, e.g., from 1 to 20% of the total initiator system, from 5 to 15%, or approximately 10% in a very short period of time (4-20 min depending on the scale). The initiator system may include a component comprising at least one ionic group, such as alkali metals, ammonium peroxodisulfates, azo compounds, and specifically water-soluble azo compounds. In some aspects, the component comprising at least one ionic group is a sodium peroxo disulfate, a potassium peroxo disulfate, or a combination thereof. In some aspects, the initiator system may include a redox initiator, such as tert-butyl hydroperoxide and/or hydrogen peroxide in combination with reducing agents, such as with sulfur compounds, an example being the sodium salt of hydroxymethanesulfinic acid, Bruggolit® FF6 and FF7, Rongalit C, sodium sulfite, sodium disulfite, sodium thiosulfate, and acetone-bisulfite adduct, or with ascorbic acid or with reducing sugars If desired, additional optional additives may be included during the pre-charge or at a later point, including crosslinker, buffer, defoamer, film forming agent, salts, or other known additives.

When included, the crosslinker may be a silane-based crosslinker, an epoxy-based crosslinker, or combinations thereof. An exemplary silane-based crosslinker is vinyl triethoxy silane, vinyl trimethoxy silane, or the like. The silane-based crosslinker may be present in an amount from 0 to 2 pphm, e.g., from 0.1 to 1.0 pphm, or from 0.2 to 0.6 pphm. An exemplary epoxy-based crosslinker is glycidyl (meth)acrylate or another monomer with epoxy functionality. The epoxy-based crosslinker may be present from 0 to 3 pphm, e.g., from 0.5 to 2.0 pphm. The crosslinker may be added during the pre-charge, during the remaining monomer feeding portion or the reaction, or during both.

Polymerization then begins, setting off an exothermic reaction, and the cooling jacket may be set to keep the reactor within <10° C. of the desired temperature. Next, the remaining amount of vinyl acetate and second monomer are added, along with additional initiator system. In some aspects, from 30 to 80% of the total amount of initiator may be added during polymerization, e.g., from 50 to 60%. When ethylene is used as the second monomer, the ethylene feed may be controlled by the pressure of the reaction, which means that the pressure is kept constant, such as at 50 bar (depending on the total amount of ethylene). This may lead to more ethylene being incorporated in the copolymer, which leads to smaller particles. When the polymerization is complete, the remaining amount of the initiator system is fed to the reactor, e.g., from 10 to 30% of the total amount of initiator system is added during the post-heating/post-reaction phase. The reactor may then be cooled and released. A final redox treatment may then be introduced to the reactor and the mixture may be stirred.

Polymeric stabilizers, such as polyvinyl alcohol, starch, hydroxyethyl cellulose, or other water-soluble cellulose derivatives are not generally included in the polymerization reaction and are present at less than or equal to 0.6 pphm, e.g., 0 pphm.

Aqueous Copolymer Dispersion

Following polymerization according to the above described method, the aqueous copolymer dispersion is removed from the reactor. The copolymer may contain at least 14 pphm second monomer, e.g., ethylene. In some aspects, the copolymer contains from 14 to 30 pphm or from 20 to 30 pphm second monomer, e.g., ethylene, based on the total amount of monomers. If included, additional monomers may be present in an amount of up to 20 pphm, e.g., from 0 to 15 pphm, or from 0.1 to 10 pphm.

The aqueous copolymer dispersion may have a solids content from 5 to 55%, e.g., from 14 to 45%, or from 30 to 45%. If desired, the final dispersion may be further diluted depending on the desired application and the desired solids content in a primer formulation. The aqueous copolymer dispersion may have a pH from 2 to 7, e.g., from 3 to 6 or from 4 to 5. The aqueous copolymer dispersion may have a viscosity from 5 mPas and 10,000 mPas, e.g., from 10 mPas to 2,000 mPas, from 10 to 1,000 mPas, or from 10 to 100 mPas, as measured by a Brookfield viscometer at 25° C., 20 rpm, and the corresponding spindle for the correct measuring range.

The aqueous copolymer dispersion may have a residual vinyl acetate content of less than 0.1%, e.g., less than 0.05%, less than 0.035%, or less than 0.01%. The aqueous copolymer dispersion may have a glass transition temperature (Tg, mid point) of less than 20° C., e.g., less than 10° C., less than 5° C., or less than 2° C.

The particle size of the aqueous copolymer dispersion is small, as discussed herein. When measured by dynamic light scattering at 90°, the aqueous copolymer dispersion has a particle size dw of less than or equal to 120 nanometers (nm), e.g., from 50 to 120 nm, from 70 to 110 nm, or from 70 to 100 nm. The distribution of the particle size may be less than or equal to 2, e.g., less than or equal to 1.5 or less than 1.3.

As described further herein, the resulting aqueous copolymer dispersion, when incorporated into a primer formulation, achieves performance comparable or superior to known acrylic-based primer formulations or styrene/acrylic-based polymers. Without being bound by theory, it is believed that the previously unachievable vinyl acetate-based copolymer dispersions, including specifically vinyl acetate-ethylene copolymer dispersions having a particle size dw of less than or equal to 120 nm is at least partially responsible for this performance. Additionally, without being bound by theory, it is believed that the hydrophilic nature of the combination of vinyl acetate and emulsifier leads to the comparable or superior performance.

Primer Formulations

The aqueous copolymer dispersions prepared according to the methods herein may be incorporated into primer formulations. The primer formulation may contain the copolymer dispersion in a way that the final solids of the primer is from 1 to 30%, e.g., from 3 to 20%, or from 5 to 15%. In some aspects, the aqueous copolymer dispersion may be diluted to achieve the desired primer solids content.

The primer formulation may also include other components, including wetting agent (such as Calgon N), defoamer (such as Tego Foamex 805), preservative, hydrophobic agent, water glass, wood protection additive, pigments, thickener, dispersing agent/stabilizer, and combinations thereof. These components may each generally be present, if at all, in an amount from 0 to 3%, based on the primer formulation.

Uses of the Primer Formulation

Once formulated, the primer formulation may be applied to a variety of substrates, where it shows good penetration into the substrate. Exemplary substrates include gypsum plate (both polished and unpolished), soft wood (such as spruce), hard wood (such as red cedar), medium density fiberboard, and other substrates. The penetration of the primer formulation comprising the inventive vinyl acetate-ethylene copolymer dispersion has equal or superior penetration as compared to known styrene/acrylic-based/acrylic based primer formulations or VAE based primers with larger particle size.

Additionally, the solidification of the primer formulation on quartz sand is equal or superior to known styrene/acrylic-based formulations, as is the solidification on quartz sand after stored in water; e.g., water resistance. This solidification on quartz sand corresponds to the bonding capability of the primer to, for instance an organic and an organic material/substrates. The bonding capability is important for stabilizing the surface of the substrate and preparing the surface of the substrate for good adhesion and homogeneous drying of the top coat. The greater the bonding capacity of a primer is the better.

An additional feature is the water-resistance, where the irreversibility of this solidification under water is tested. The better the irreversibility, the better the primer. This is important especially if paints are used in humid environment like bath rooms or exterior paints.

The primer formulation comprising the aqueous copolymer dispersion may be used in a variety of applications and fields, including in paint and coating primers, on gypsum materials, on inorganic surface materials, on organic surface materials, on soft wood materials, on hard wood materials, on old paint and rendering surfaces, in adhesive applications, and in construction applications.

The present invention will be better understood in view of the following non-limiting examples.

EXAMPLES

Testing Parameters and Methodologies

Copolymer Dispersion Particle Size Determination by DLS (relevant): The size of the solid particles within the copolymer dispersions used herein can be determined by dynamic light scattering (DLS) or also named photon correlation spectroscopy (PCS) based on ISO 22412.

The instrument used is an ALV goniometer CGS-3 which consists essentially of 1) the laser optics with toluene-filled index-matching bath for the sample cuvette, (toluene filtered by 0.2 μm PTFE filter), 2) the laser at 633 nm, 35 mW, 3) the PC-controlled servomotor for adjusting the angle of the photomultiplier to the fixed angle of 900 of the index-matching bath, 4) the thermo element for measuring and controlling the matching bath temperature (at 297 K) and 5) the ALV-Correlator Software V.3.0.

To measure the particle size, the cuvette is filled to ¾ of its capacity with filtered water (conductivity of 18.2 μS/m) and the copolymer dispersion sample. If necessary the diluted sample may be filtered before. The appropriate measurement concentration must be within the count rate of 40-300 kHz at an angel of 90° (conc.: 0.0002%-0.0005%). The cuvette is placed in the toluene bath and the measurement is started, after a temperate time of 60 s. The measuring time at 90° at a wavelength of 633 nm, a refractive index of 1,332 and a viscosity of 0.89 mPas, is 120 s.

After completion of the fully automatic PCS measurement at 90° and its evaluation via the Contin fit method evaluation a statement about mean particle size values dn, dw and dw/dn can be made.

Representation of results: ISO 9276-2 (2014): Representation of results of particle size analysis Part 2: Calculation of average particle sizes/diameters and moments from particle size distributions. The Contin evaluation uses the following parameters:

min. decay time=0.01 ms
max decay time=1000 ms
enable fit additional baseline, zero order regularizor, data weighting
first datapoint=4
last datapoint=187
number of gridpoints=65
lower radius for distribution=5.00 nm
upper radius for distribution=1500 nm Average Values of the Particle Diameter:

Numerical mean value: $d_n = \Sigma n_i d_i / \Sigma n_i$

Weight average: $d_w = \Sigma w_i d_i / \Sigma w_i = \Sigma n_i d_i^4 / \Sigma n_i d_i^3$ After evaluation the number and mass mean values within the range of 5 nm to 1500 nm and mean particle size values dn, dw and dw/dn are obtained.

Copolymer Glass Transition Temperature (Tg) Determination: The glass transition temperature, Tg, can be obtained by using a commercial differential scanning calorimeter Mettler DSC 820 with a fluid N2 cooling system and autosampler at 10 K/min according to ISO 16805. For evaluation, the second heating curve is used and the DIN 51007 mid-point calculated.

Viscosity measurement by Brookfield measurement: The measurement is done according to ISO 2555. A Brookfield measurement system RVDV-I Prime is used. 500 g of the dispersion is added into a small beaker. The measurement is done at 25° C. with 20 rpm and spindle 1. The viscosity is recorded after stable conditions are achieved.

Solids measurement: The solids measurement is done according to ISO 3251 at 130° C. for 30 minutes.

pH measurement: The pH measurement is done according to ISO 976 (2013).

Examples 1-4 (Inventive)

Four formulations were prepared according to the following description, with varied amounts of nonionic emulsifier, ionic emulsifier, ethoxy vinyl silane, and glycidyl methacrylate as reported below. Example 3, described below, was prepared as follows.

Into a pressure reactor fitted with an anchor stirrer (running at 120 rpm), a heating jacket, dosage pumps and having a volume of 30 liters, a water based solution of the following components was added:

TABLE 1

| Component (g) | Amount |
|---|---|
| 11999 | Water (deionized) |
| 266 | Alkyl polyglycol ether (28 mols of Ethylene Oxide)-nonionic emulsifier (70% active) |
| 2173 | Alkyl sulfate (15% in deionized water of an anionic emulsifier) |
| 23.7 | Sodium acetate (anhydrous) |
| 373 | Sodium vinyl sulfonate (25% active) |
| 3.73 | Sodium disulfite |
| 1.13 | Defoamer Agitan 282 |

The reactor was purged with nitrogen to eliminate oxygen. Out of a total amount of 7637 g of vinyl acetate, 5.0% of the vinyl acetate was added under stirring to the water phase in the reactor. The reactor was heated to 85° C.

At 75° C., the ethylene valve was opened to add approximately 950 g ethylene out of 1676 g ethylene total (57%) and the reactor was pressurized to 50 bar.

At 85° C., 10% of the initiator solution (46.6 g sodium peroxo disulfate in 784 g of deionized water) was added within 4 minutes into the reactor. The polymerization started by showing exothermic behavior and the cooling jacket was set to 73° C. At the same time the monomer feed (the remaining vinyl acetate 7172 g) was started and ran for 2 hours. The initiator rate controlled the reaction temperature, which was kept at 85° C. Within the feeding time, approximately 60% of the initiator solution is used.

After the polymerization was finished, the jacket temperature was set to 88° C. and the remaining 30% of the initiator was fed into the reactor over a 15 minute period. Additionally, the temp was kept at 85° C. for additional 15 minutes. The reactor was then cooled to approximately 55° C. and released.

A final redox treatment was be made at this point by introducing Bruggolit FF 6 (a mixture based on a sodium salt of a sulfinic acid and sulfonic acid derivatives, obtained from L. Brüggemann KG). For 3 kg of the copolymer dispersion 1.56 g FF6 in 19.3 g of deionized water was added at 50° C., stirred for 15 min and afterwards 3.30 g of tert-butyl hydroperoxide (70% active) was added. The mixture was stirred for 2 h at 50° C.

The resulting copolymer dispersions were tested using the testing methodologies described above. The compositional differences are shown in Table 2 below and the test results are shown in Table 3 below.

TABLE 2

| | Nonionic emulsifier [pphm] | Ionic emulsifier [pphm] | Ethoxy vinyl silane | Glycidyl methacrylate |
|---|---|---|---|---|
| Example 1 | 1.5 | 2.5 | 0 | 0 |
| Example 2 | 2 | 2.5 | 0 | 0 |
| Example 3 | 2 | 3.5 | 0 | 0 |
| Example 4 | 2 | 3.5 | 0.6 | 1.0 |

TABLE 3

| Test Parameter | Results | | | |
| --- | --- | --- | --- | --- |
| | Ex. 1 | Ex. 2 | Ex. 3 | Ex. 4 |
| Solids Content (%) | 39.9 | 39.9 | 39.9 | 39.0 |
| pH | 4.4 | 4.3 | 4.2 | 4.3 |
| Viscosity Brookfield (mPas) | 25 | 27 | 21 | 19 |
| Glass transition temperature (Tg) | −1.0° C. | −1.0° C. | 1.0° C. | 3.3° C. |
| Particle Size (DLS) | dw = 78 nm dw/dn = 1.06 | dw = 82 nm dw/dn = 1.07 | dw = 86 nm dw/dn = 1.07 | dw = 97 nm dw/dn = 1.18 |

Examples 5-7 (Non-Inventive)

Three commercial copolymer dispersions as shown in Table 4 below were tested as described in Example 1. The results of the testing are shown in Table 5. "VAE" refers to vinyl acetate-ethylene.

TABLE 4

| | Name | Chemistry | Particles | Remark |
| --- | --- | --- | --- | --- |
| Example 5 | Celanese Mowilith LDM 1871 C | VAE | >120 nm | Commercial standard VAE with large particles |
| Example 6 | Celanese Mowilith LDM 7667 | S/A (styrene/ acrylic) | <120 | Commercial standard S/A with small particles - Celanese |
| Example 7 | AlberdingkUSA ® H 595 | S/A (styrene/ acrylic) | <120 | Commercial standard S/A with small particles - competitor |

TABLE 5

| Test Parameter | Results | | |
| --- | --- | --- | --- |
| | Ex. 5 | Ex. 6 | Ex. 7 |
| Solids Content of Polymer Dispersion (%) | 53 | 34 | 30 |
| pH | 4.5 | 8.5 | 8.5 |
| Viscosity Brookfield (mPas) | 2500 | 50 | 30 |
| Glass transition temperature (Tg) | 13° C. | 7° C. | 9° C. |
| Particle Size (DLS) | dw = 439 nm dw/dn = 1.11 | dw = 55 nm dw/dn = 113 | dw = 51 nm dw/dn = 1.14 |

Examples 1P-7P (Preparation of the Primer Formulation and Testing)

Next, the polymer dispersions of Examples 1-7 were formulated into primer formulations (Examples 1P-7P) and tested for various properties as shown in Table 6 below. To prepare the primer formulations (here with copolymer dispersion example 6) with a laboratory stirrer, water was placed in a suitable 2 liter stirring vessel. While stirring, 10 parts by weight of Calgon N, 10% (a wetting agent), 1.0 parts by weight Tego Foamex 805 (a defoamer) and 380 parts by weight Mowilith LDM 7667 (example 6), approximately 34% solids (the binder) were added into 609.0 parts by weight water. The formulation was stirred for 10 minutes at room temperature. The resulting primer formulation had a solids content of 13% weight by weight and a specific gravity at 20° C. of 1.0 g/cm³ and was the primer for further tests.

Each primer formulation was then tested for its penetration on different surfaces as shown below in Table 6. The test method for each surface varied. Generally, 0.3 ml primer was dripped onto the surface of the test substrate. After the primer formulation dried, the penetration was assessed visually, with a score from 1 to 6. The scoring methodology was as follows:

1 full penetration/no gloss/no material on surface visible;

2 full penetration/slight gloss at the edges/small amount of material at the edges visible;

3 approximately 50% of the material is not penetrated/ gloss at the edges/significant amount of material at the edges visible;

4 approximately 70% of the material is not penetrated/ gloss at the edges/significant amount of material at the edges visible;

5 More than approximately 70% of the material is not penetrated/gloss overall on the surface/in the middle still a crater is visible; and 6 no penetration/material stays completely on the surface/ gloss overall visible/in the middle no crater is visible.

A mean value 2 over all five tests indicated a good result. The test was carried out three times and averaged for a final score. The result was then confirmed by a second observer.

To prepare a gypsum plate, a gypsum plaster (e.g. Knauf rotband adhesive plaster) was mixed with water in a clean bucket or similar. The plaster was applied to a fiber cement plate and smoothed. While drying, the surface was moistened with a water sprayer and dried off with a felt pad. After drying, half of the test plate was sanded with sandpaper (e.g. 100 grit).

To prepare a soft wood plate (spruce), the wood was cut and planed into a 70 mm by 5 mm by 150 mm plate.

To prepare a hard wood plate (red cedar), the wood was cut and planed into a 70 mm by 10 mm by 250 mm plate.

Each formulation was also tested for solidification on quartz sand. This corresponds to the binding capacity of the primer. For this test, a cup was filled with quartz sand (for instance W10, Quarzwerke Frechen) which was then compacted by repeated, gentle belching. A trough with a diameter of approx. 30 mm was created on the surface. 2 ml of the primer were dropped into this well (solid content 13%). After a drying time of approximately 1 day, the solidified quartz sand body was carefully removed from the loose sand with a brush. The quartz sand body was weighed. The higher the weight, the better the solidification. The weight is noted in grams (g). A weight of 8 grams or greater indicated a good result.

TABLE 6

| | Ex. 1P | Ex. 2P | Ex. 3P | Ex. 4P | Ex. 5P | Ex. 6P | Ex. 7P |
|---|---|---|---|---|---|---|---|
| | | | Penetration [score 1-6] | | | | |
| Gypsum (unsanded) | 1 | 1 | 1 | 1 | 1 | 1 | 1 |
| Gypsum (sanded) | 1 | 1 | 1 | 1 | 1 | 1 | 1 |
| Spruce | 4 | 5 | 3 | 1 | 5 | 5 | 2 |
| Red Cedar | 1 | 1 | 1 | 1 | 4 | 4 | 4 |
| Fiber Board | 1 | 1 | 1 | 1 | 1 | 4 | 1 |
| Average | 1.6 | 1.8 | 1.4 | 1 | 2.4 | 3 | 1.8 |
| | | | Penetration/Solidification [g] | | | | |
| Quartz Sand | 10.4 | 10.2 | 10.4 | 8.8 | 5.2 | 12.8 | 12.6 |

Water Resistance Testing

An additional feature is the water resistance. Next, the water resistance of the quartz sand body of Examples 1P-7P was tested by placing the quartz sand body in water for one hour. The strength of the quartz sand body was determined by slight pressure on the test body. A score of 1 to 4 was assigned. A score of 1 indicated very good water resistance and a hard and complete quartz sand body. A score of 2 indicated that the quartz sand body softened but was still complete. A score of 3 indicated that the quartz sand body softened and its strength was low. A score of 4 indicated that the quartz sand body fell apart completely. The results are shown below in Table 7.

TABLE 7

| | Ex. 1P | Ex. 2P | Ex. 3P | Ex. 4P | Ex. 5P | Ex. 6P | Ex. 7P |
|---|---|---|---|---|---|---|---|
| Water Resistance [score 1-4] | 4 | 4 | 4 | 1 | 4 | 1 | 3 |

As shown above, the water resistance testing for Inventive Example 4P showed a good result which was comparative to Non-Inventive Example 6P which used a commercially available polymer dispersion based on styrene/acrylic, and superior to Comparative Examples 5P and 7P. In order to confirm the water resistance score, the amount of nonionic emulsifier, ionic emulsifier, ethoxy vinyl silane, and glycidyl methacrylate included in the polymer dispersion was modified. Each of Examples 8-11 and 8P-11P were prepared as described for Examples 1-7 and 1P-7P. The compositions are shown in Table 8 and the results are shown in Tables 8 and Table 9.

TABLE 9

| | Results | | | |
|---|---|---|---|---|
| Test Parameter | Ex. 8 | Ex. 9 | Ex. 10 | Ex. 11 |
| Solids Content (%) | 38.7 | 38.2 | 37.8 | 38.0 |
| pH | 4.3 | 4.3 | 4.3 | 4.3 |
| Viscosity Brookfield (mPas) | 20 | 19 | 19 | 20 |
| Glass transition temperature (Tg) | 3.4° C. | 1.4° C. | 2.0° C. | 2.4° C. |
| Particle Size (DLS) | dw = 113 nm dw/dn = 1.12 | dw = 107 nm dw/dn = 1.12 | dw = 106 nm dw/dn = 1.08 | dw = 104 nm dw/dn = 1.10 |

As is apparent from Tables 8 and 9, Example 2P was modified as Example 11P to include 0.3 pphm ethoxy vinyl silane and 0.5 pphm glycidyl methacrylate, silane-based and epoxy-based crosslinkers, respectively, resulting in a change in water resistance score from 4 to 1. Example 3P was modified as Example 8P to include 1.0 pphm glycidyl methacrylate, which did not result in a change in water resistance score. Next, Example 3P was modified as Example 9P to include 0.6 pphm ethoxy vinyl silane, resulting in a change in water resistance score from 4 to 1. Example 3P was yet again modified as Example 10P to include 0.3 pphm ethoxy vinyl silane and 0.5 pphm glycidyl methacrylate, resulting in a change in water resistance score

TABLE 8

| | Nonionic emulsifier [pphm] | Ionic emulsifier [pphm] | Ethoxy vinyl silane [pphm] | Glycidyl methacrylate [pphm] | Water Resistance [Score 1-4] |
|---|---|---|---|---|---|
| Example 1P | 1.5 | 2.5 | 0 | 0 | 4 |
| Example 2P | 2 | 2.5 | 0 | 0 | 4 |
| Example 3P | 2 | 3.5 | 0 | 0 | 4 |
| Example 4P | 2 | 3.5 | 0.6 | 1.0 | 1 |
| Example 8P | 2 | 3.5 | 0 | 1.0 | 4 |
| Example 9P | 2 | 3.5 | 0.6 | 0 | 1 |
| Example 10P | 2 | 3.5 | 0.3 | 0.5 | 1 |
| Example 11P | 2 | 2.5 | 0.3 | 0.5 | 1 | from 4 to 1. Accordingly, without being bound by theory, it is believed that including either a silane-based crosslinker or a combination of a silane-based and epoxy-based crosslinker, the water resistance score of the primer formulation may be dropped to 1, resulting in a formulation with comparable or superior water resistance to known commercial primers.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of skill in the art. Furthermore, those of ordinary skill in the art will appreciate that the foregoing description is by way of example only, and is not intended to limit the invention.

We claim:

1. A method for preparing an aqueous copolymer dispersion by emulsion polymerization, the method comprising:
   a) pre-charging a reactor with a pre-charge comprising vinyl acetate monomer, a second monomer, wherein the second monomer is ethylene, butyl acrylate, vinyl nodecanoate, or 2-ethylhexyl acrylate, an ionic-group containing monomer, water, and an emulsifier system, wherein the pre-charge comprises from 0.5 to 20% of the total amount of vinyl acetate and at least 30% of the total amount of the second monomer;
   b) adding a remaining amount of vinyl acetate monomer and the second monomer to the reactor;
   c) adding an initiator system to the reactor; and
   d) conducting the polymerization reaction at a temperature of >65° C. to form an aqueous vinyl acetate-second monomer copolymer dispersion having a solids content from 5 to 55% and a particle size of dw less than or equal to 120 nm as measured by dynamic light scattering at 90° (Contin Fit);
   wherein the emulsifier system is present in an amount from 4 to 8 pphm; and
   wherein monomers in the copolymer dispersion consist of a) the vinyl acetate monomer, b) the second monomer, c) the ionic-group containing monomer, d) optionally one or more non-functional monomer(s) and e) optionally one or more functional monomer(s) comprising a silane, glycidyl methacrylate, a vinyl sulfonate, methacrylic acid, acrylic acid, or combinations thereof.

2. The method of claim 1, wherein the emulsion polymerization is conducted at a temperature of >75° C.

3. The method of claim 1, wherein the second monomer is ethylene.

4. The method of claim 1, wherein the pre-charge comprises from 0.5 to 10% of the total amount of vinyl acetate monomer.

5. The method of claim 1, wherein the second monomer is present in an amount of >14 pphm.

6. The method of claim 1, wherein the pre-charge comprises >50% of the total amount of the second monomer.

7. The method of claim 1, wherein the initiator system includes at least one ionic group.

8. The method of claim 1, wherein the initiator system comprises at least one of sodium peroxo disulfates, potassium peroxo disulfates, and combinations thereof.

9. The method of claim 1, wherein the initiator system is present in an amount of at least 0.2 pphm.

10. The method of claim 1, wherein the emulsifier system comprises ionic emulsifiers, non-ionic emulsifiers, or combinations thereof.

11. The method of claim 1, wherein the emulsifier system comprises an ionic emulsifier, and wherein the ionic emulsifier comprises an alkyl sulfate, an alkyl ethoxy sulfate, or an alkyl sulfonate.

12. The method of claim 1, wherein the emulsifier system comprises a non-ionic emulsifier, and wherein the non-ionic emulsifier comprises an alkyl ethoxylate.

13. The method of claim 1, wherein the ionic-group containing monomer is present in an amount of >0.2 pphm.

14. The method of claim 1, wherein the ionic-group containing monomer comprises sodium vinyl sulfonate.

15. The method of claim 1, wherein the solids content of the polymer dispersion is from 14 to 46%.

16. The method of claim 1, wherein the polymerization is conducted in a stirred tank reactor system in a non-continuous way.

17. The method of claim 1, wherein the particle size distribution dw/dn measured by DLS at 90° is 2 or less.

18. The method of claim 1, wherein polymeric stabilizers are present in an amount of 0.6 parts per hundred monomers or less.

19. A method for preparing an aqueous copolymer dispersion by emulsion polymerization, the method comprising:
   a) pre-charging a reactor with vinyl acetate monomer, ethylene monomer, an ionic-group containing monomer, water, and an emulsifier system, wherein the pre-charge comprises from 0.5 to 20% of the total amount of vinyl acetate and at least 30% of the total amount of ethylene;
   b) adding a remaining amount of vinyl acetate monomer and ethylene monomer to the reactor;
   c) adding an initiator system to the reactor; and
   d) conducting the polymerization reaction at a temperature of >65° C. to form an aqueous vinyl acetate-ethylene copolymer dispersion having a solids content from 5 to 55% and a particle size of dw less than or equal to 120 nm as measured by dynamic light scattering at 90° (Contin Fit);
   wherein the emulsifier system is present in an amount from 4 to 8 pphm; and
   wherein monomers in the copolymer dispersion consist of a) the vinyl acetate monomer, b) the ethylene monomer, c) the ionic-group containing monomer, d) optionally one or more non-functional monomer(s) and e) optionally one or more functional monomer(s) comprising a silane, glycidyl methacrylate, a vinyl sulfonate, methacrylic acid, acrylic acid, or combinations thereof.

20. The method of claim 1, wherein d) and e) are each present.

* * * * *